Jan. 7, 1930.  J. W. SNEDEKER  1,742,620
MANUFACTURE OF WIRE FENCING
Filed May 20, 1927    10 Sheets-Sheet 1
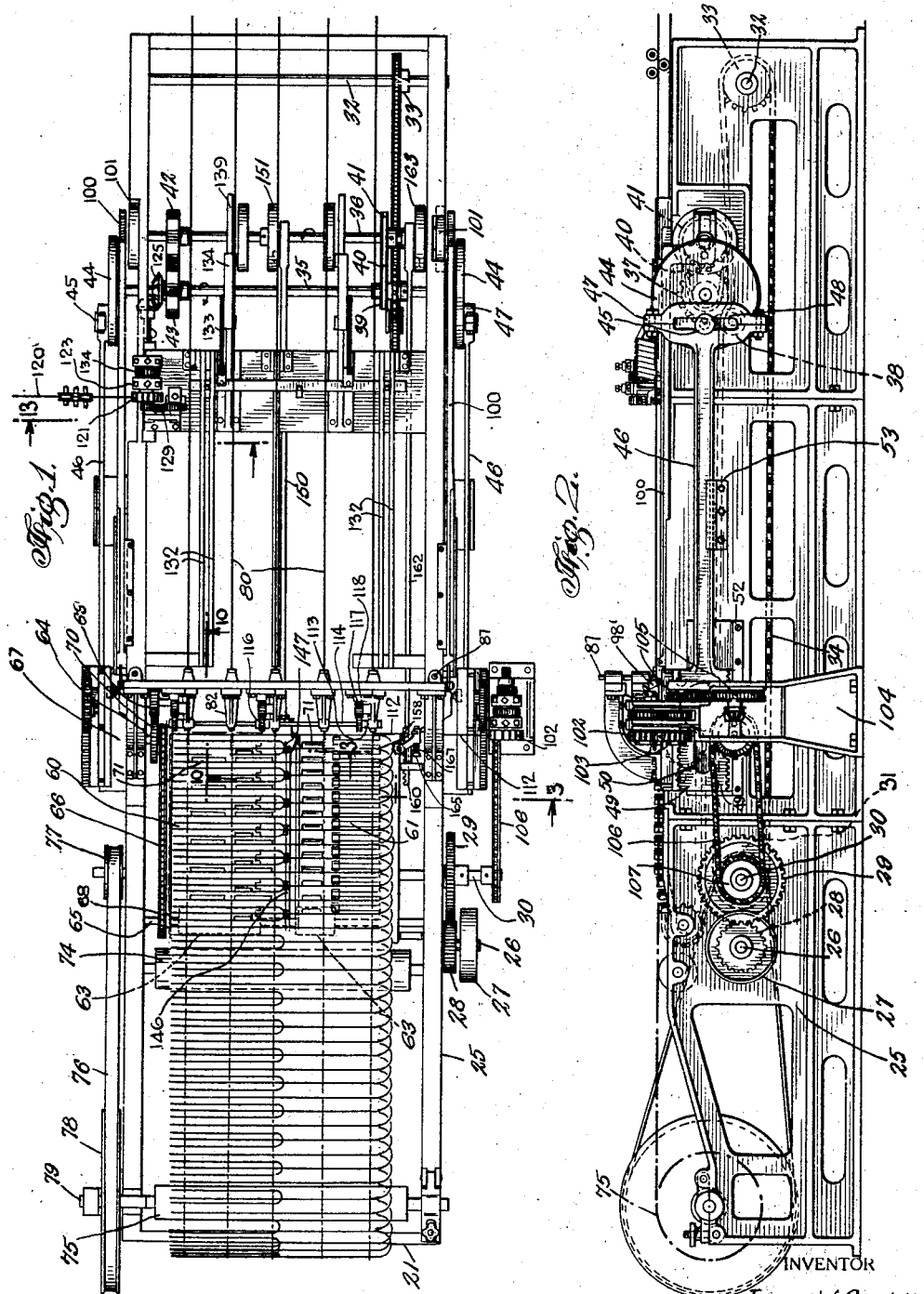

Jan. 7, 1930.  J. W. SNEDEKER  1,742,620
MANUFACTURE OF WIRE FENCING
Filed May 20, 1927   10 Sheets-Sheet 2
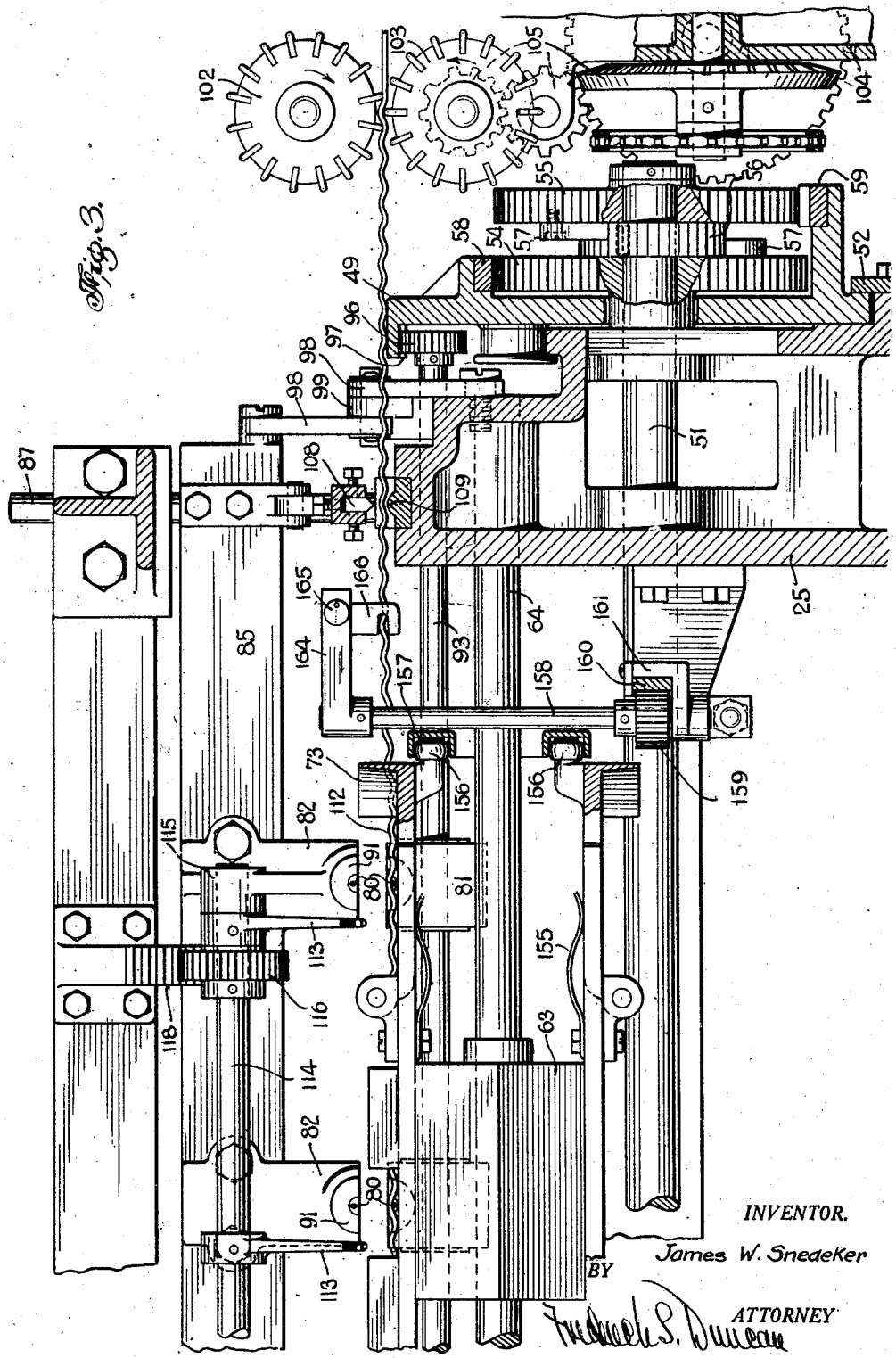
INVENTOR.
James W. Snedeker
BY
ATTORNEY

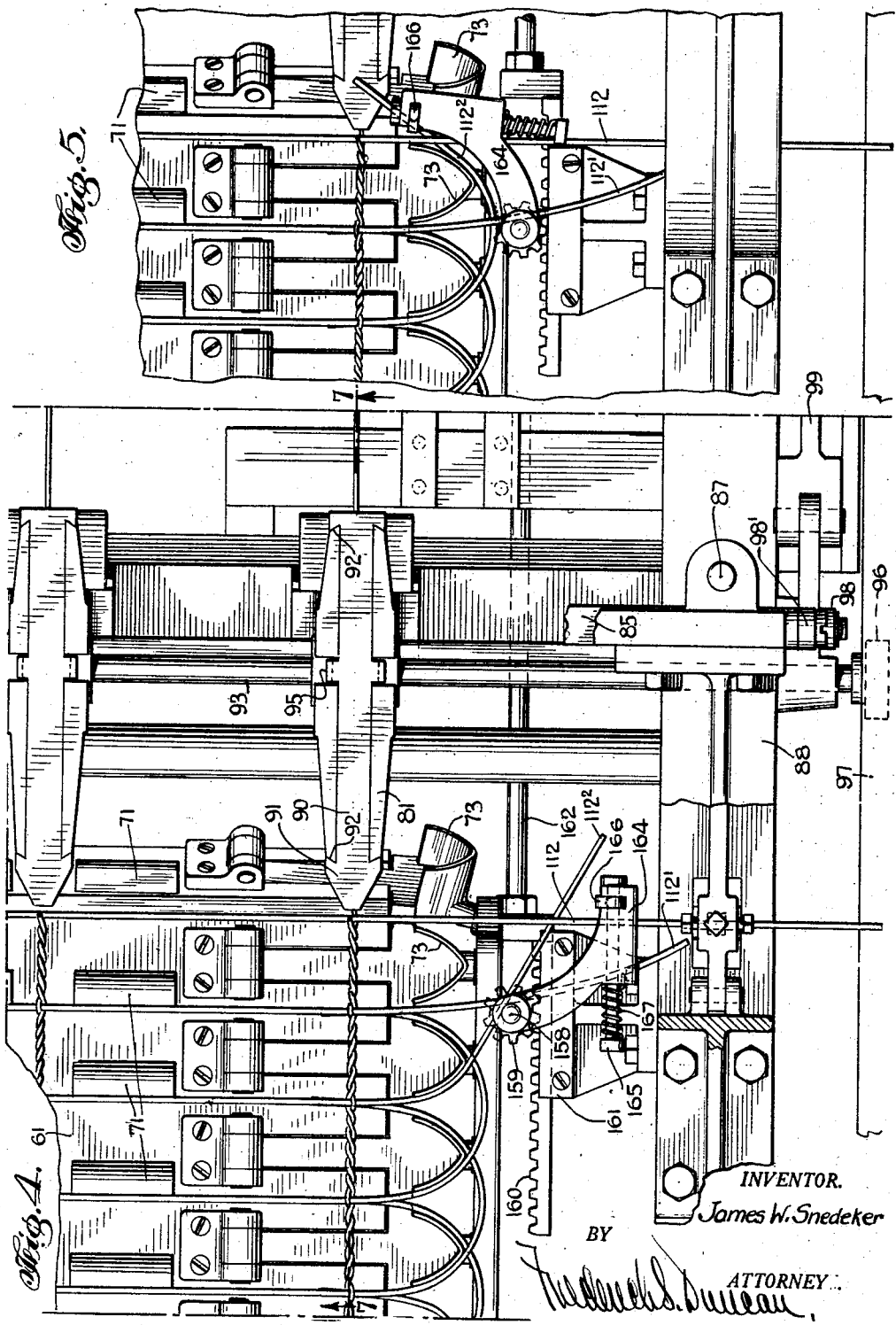

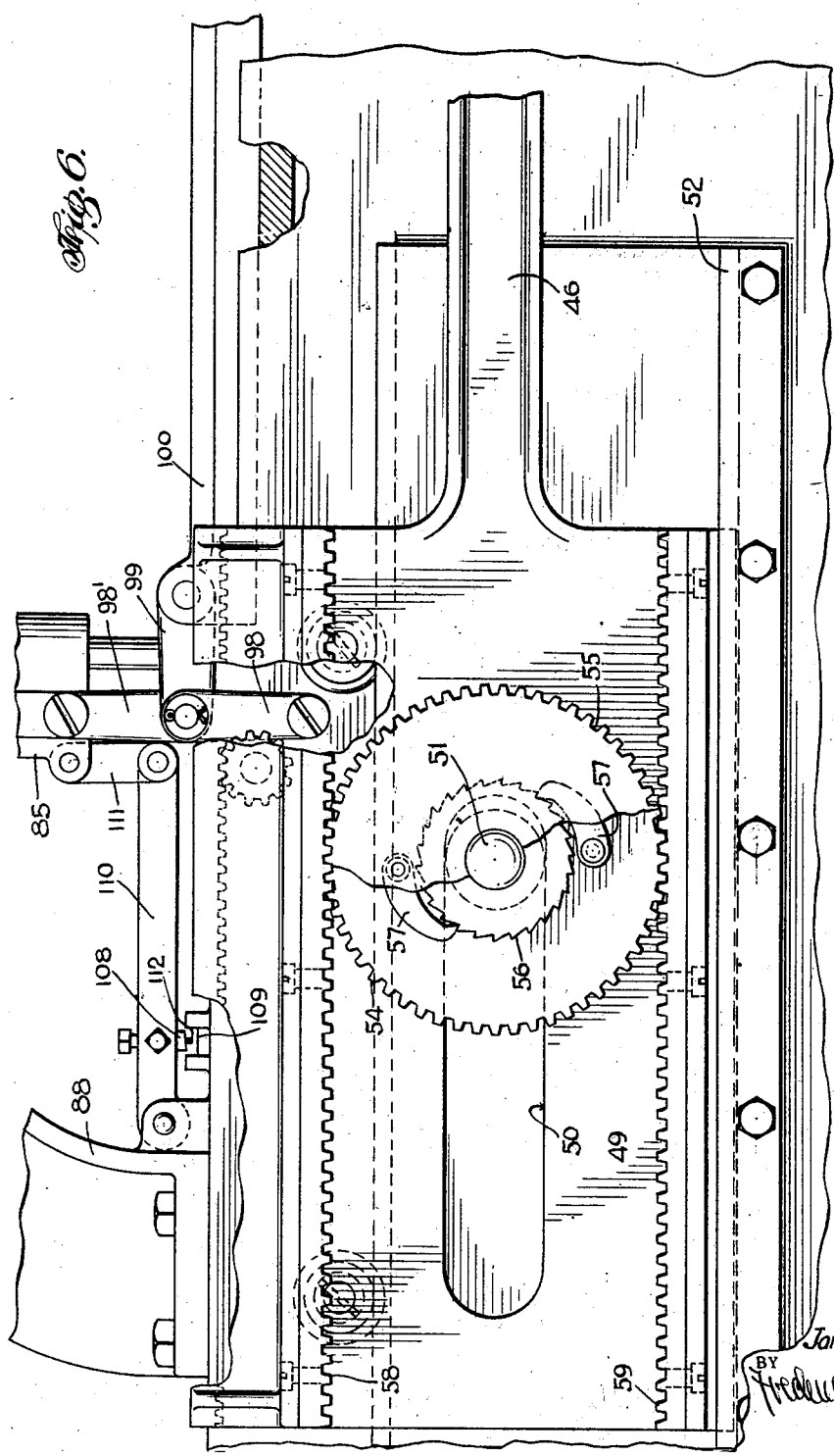

Jan. 7, 1930.  J. W. SNEDEKER  1,742,620
MANUFACTURE OF WIRE FENCING
Filed May 20, 1927  10 Sheets-Sheet 5
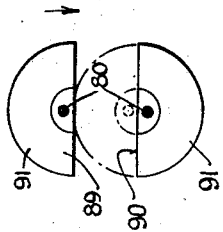
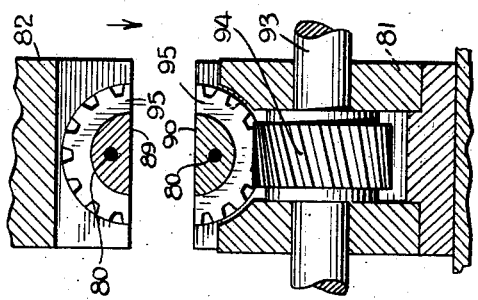
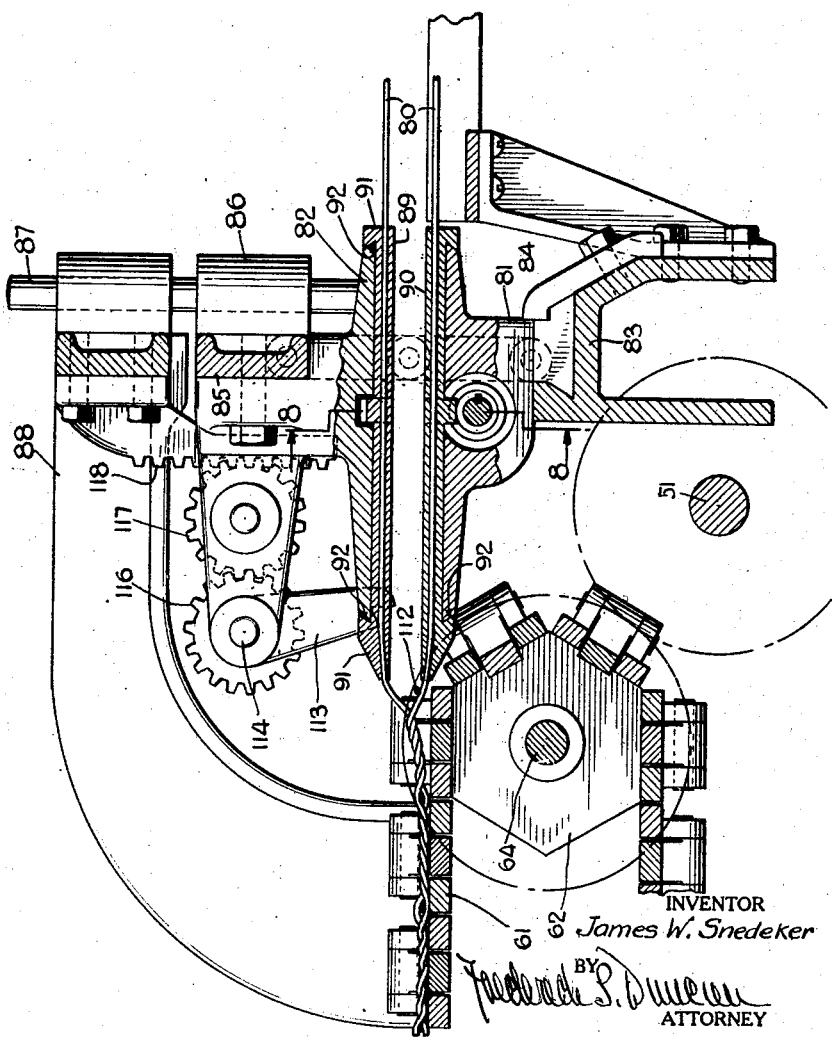
INVENTOR
James W. Snedeker
BY
ATTORNEY

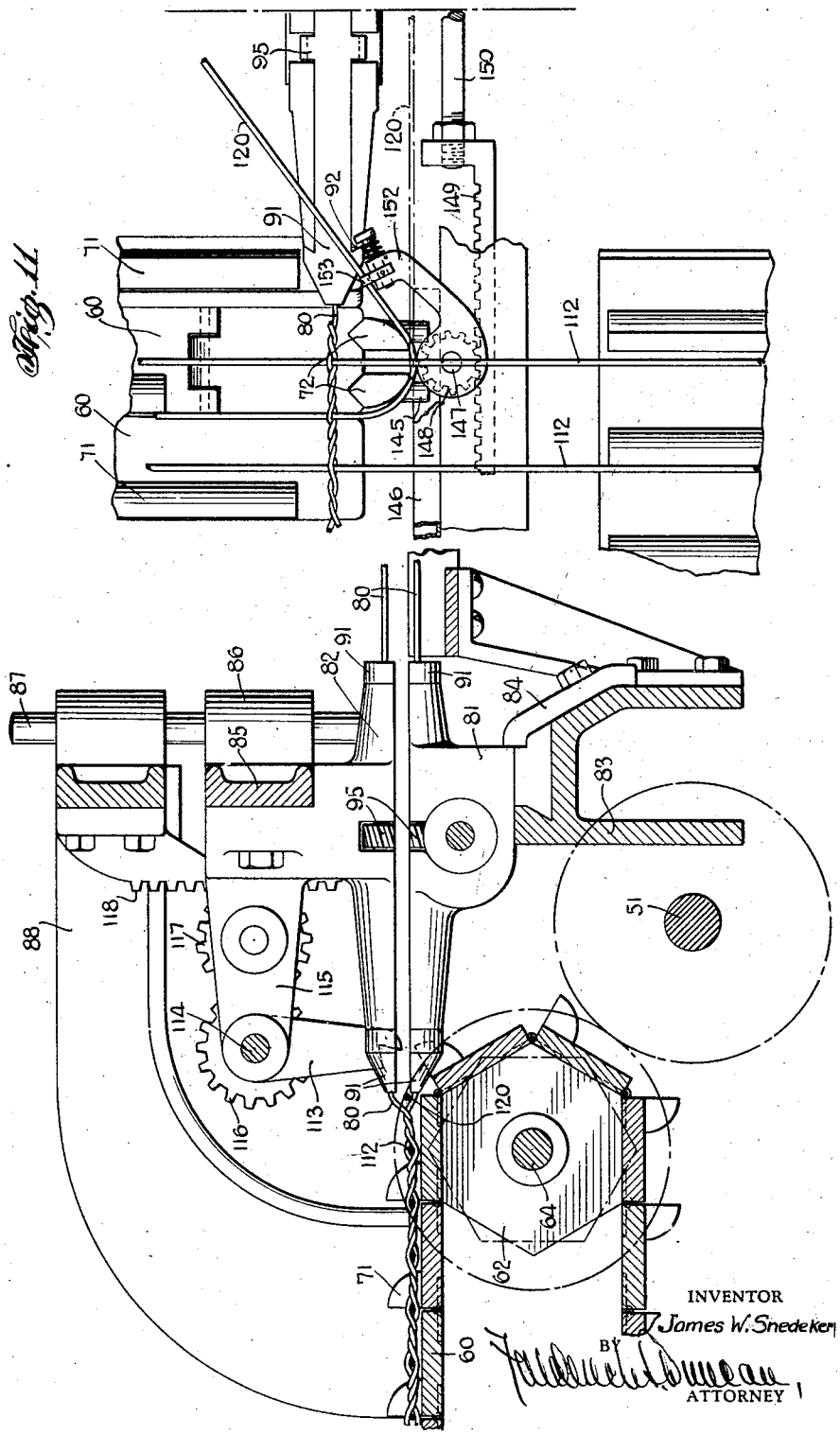

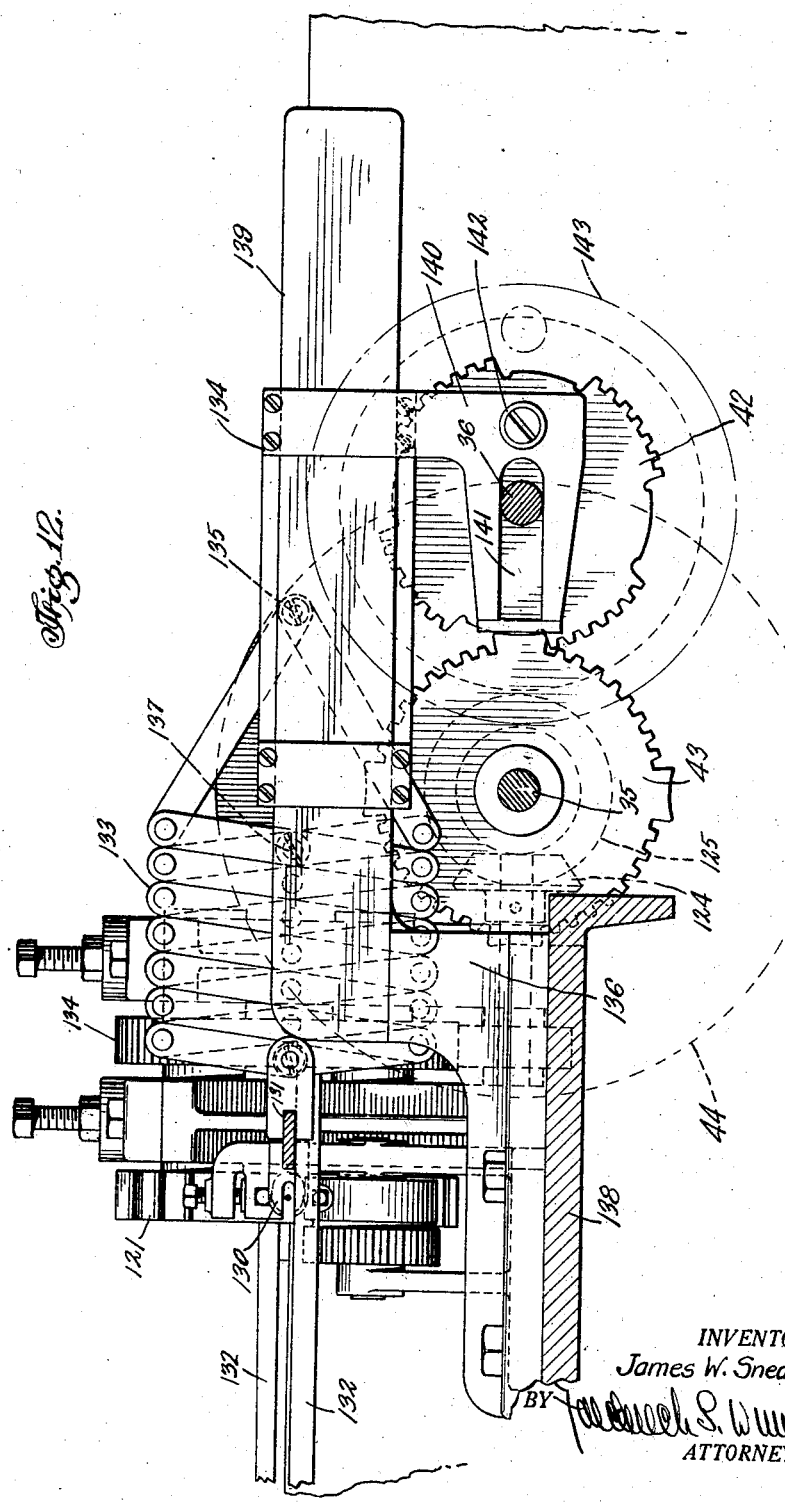

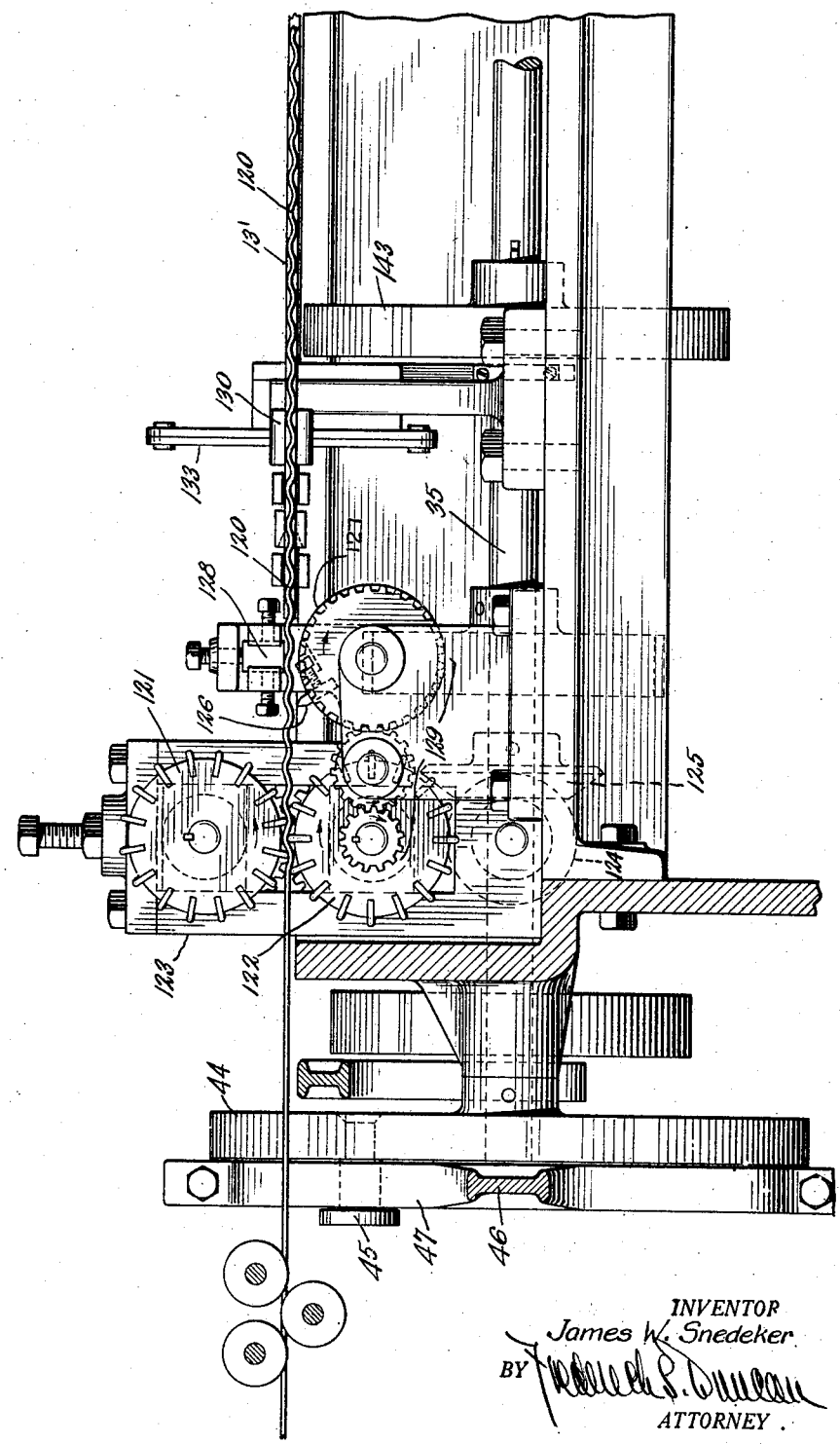

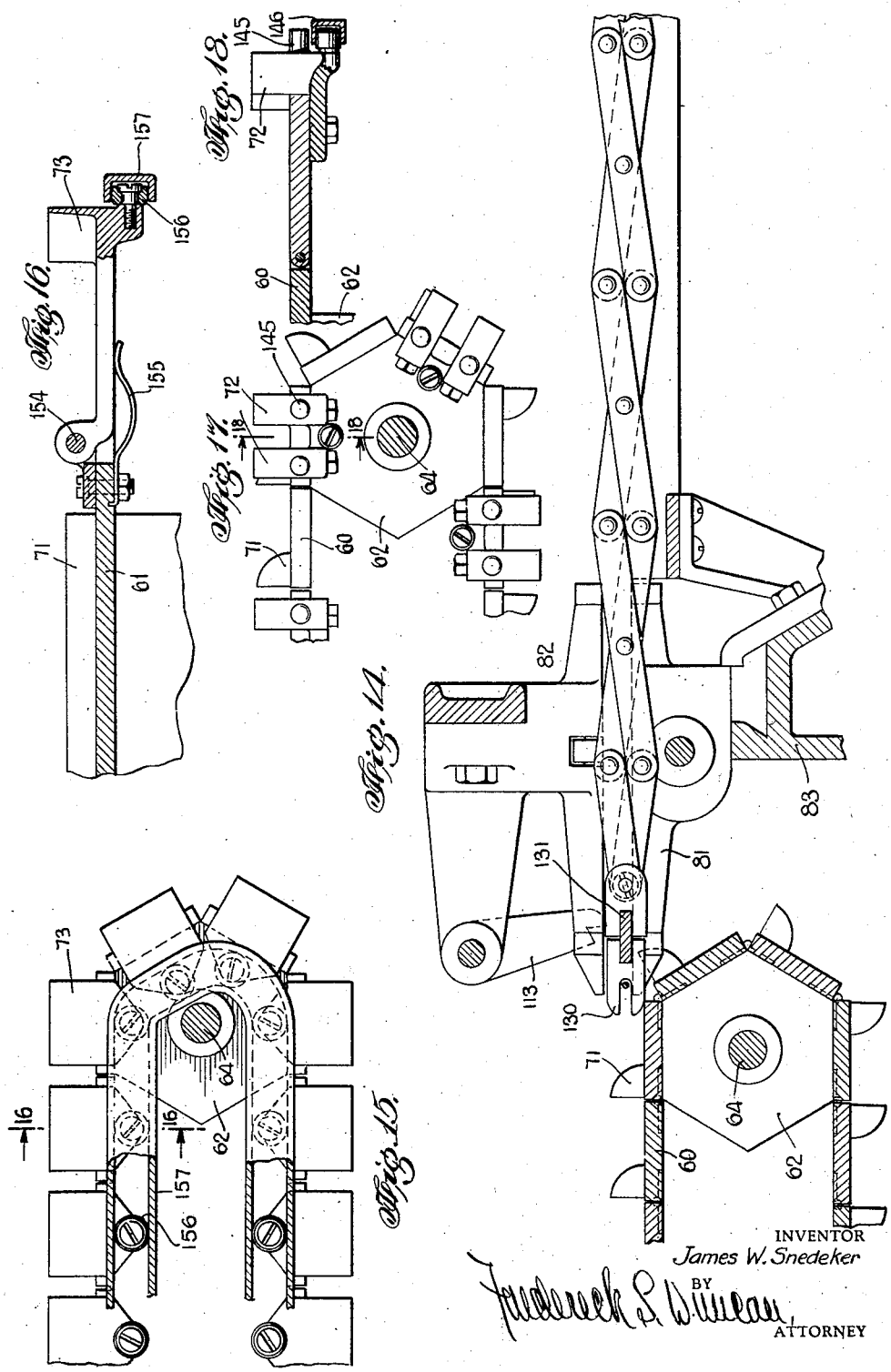

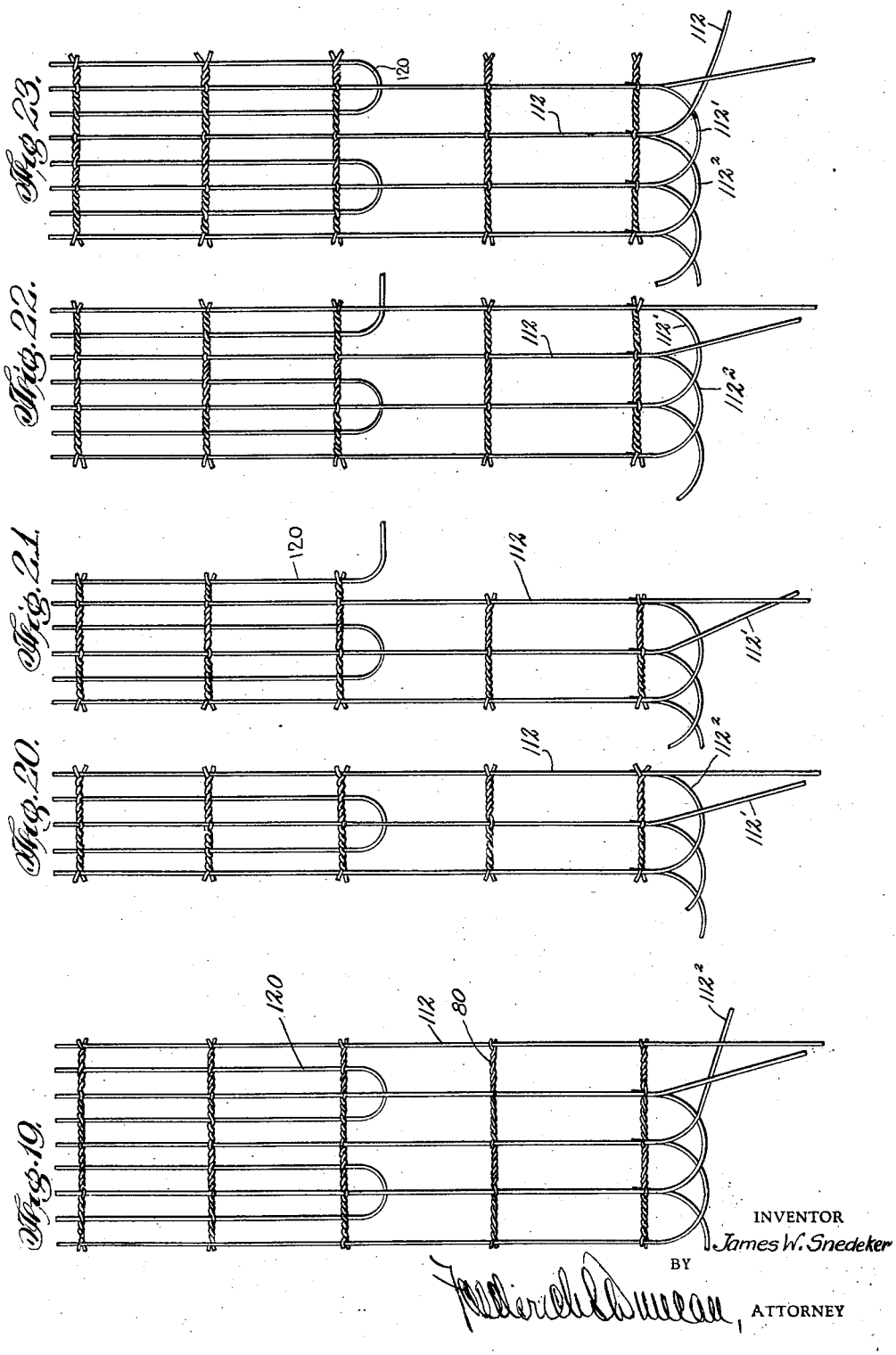

Patented Jan. 7, 1930

1,742,620

UNITED STATES PATENT OFFICE

JAMES W. SNEDEKER, OF ADRIAN, MICHIGAN, ASSIGNOR TO PAGE STEEL AND WIRE COMPANY, A CORPORATION OF NEW JERSEY

MANUFACTURE OF WIRE FENCING

Application filed May 20, 1927. Serial No. 192,890.

My invention relates to improvements in fence looms and particularly to looms designed for producing ornamental fencing.

An object of my invention is to provide a machine on which wire fencing may be woven in continuous lengths as long as may be desired.

Another object of the invention is to provide a machine for automatically weaving wire fencing of the type including a series of pickets whose upper ends are bent to form arches.

Another object of the invention is to provide a machine for producing a fence of the character described above in which each arch will cross over the next adjacent picket and will have its free end secured to the second picket therefrom.

Another object of the invention is to provide a machine for producing a fence having main pickets and secondary pickets between the main pickets, the secondary pickets extending from the bottom of the fence to a point about midway of its height.

Another object of the invention is to provide a machine for producing a fence formed with alternate long and short pickets, the short pickets being arranged in pairs integrally connected at the top by arches. In other words, the pairs of short pickets are of hairpin form with the opposite legs of each hairpin respectively positioned between successive pairs of long pickets.

With these and other objects in view my invention consists in certain novel features of construction and combination and arrangements of parts, which will be more fully hereinafter described and pointed out in the claims.

In the accompanying drawings,

Figure 1 is a plan view of my improved fence loom;

Fig. 2 is a side elevation of the same;

Fig. 3 is a view in cross section taken on the line 3—3 of Fig. 1, and showing a portion of my loom greatly enlarged;

Fig. 4 is a plan view, partly broken away, of a portion of my loom showing the mechanism for forming the ends of the long pickets and the lower part of the twister heads which twist the warp wires;

Fig. 5 is a fragmentary plan view similar to Fig. 4 but showing certain parts in a different position;

Fig. 6 is a side view of a portion of my loom partly broken away and showing certain mechanism associated with the twister heads;

Fig. 7 is a view in longitudinal section taken on the line 7—7 of Fig. 4 showing a twister head in open position;

Fig. 8 is a view in transverse section taken on the line 8—8 of Fig. 7;

Fig. 9 is an end view of a portion of a twister head showing the twister head in open and in closed positions;

Fig. 10 is a view in longitudinal section similar to Fig. 7, but taken on the line 10—10 of Fig. 1 and showing a twister head in partly closed position;

Fig. 11 is a plan view of a portion of my loom, showing a picket being bent into hair pin form;

Fig. 12 is a view in longitudinal section of a portion of my loom, the section being taken on the line 12—12 of Fig. 1;

Fig. 13 is a view in transverse section of a portion of my loom, the section being taken on the line 13—13 of Fig. 1;

Fig. 14 is a fragmentary view in longitudinal section showing a lazy tongs mechanism advancing a picket between the twister heads;

Fig. 15 is a side elevation of a portion of a conveyer belt bearing anvils about which the ends of the long pickets are formed;

Fig. 16 is a view in transverse section taken on the line 16—16 of Fig. 15;

Fig. 17 is a side elevation of the portion of a conveyer belt bearing anvils about which the hairpin pickets are formed;

Fig. 18 is a view in cross section taken on the line 18—18 of Fig. 17; and

Figs. 19 to 23 inclusive, are views showing successive stages in the weaving of a fence on my loom.

In general my machine comprises a horizontal conveyer on which the fencing is formed. The fencing comprises a plurality of warp wires arranged in pairs. These wires are taken from suitable reels at one end of the machine and are wound up in the finished product upon a roller at the opposite end of the machine. The pairs of warp wires are intermittently spread apart vertically, to form a shed into which a picket is introduced, and after each picket is introduced the pairs of wires are twisted to secure the picket in place. The twisting is periodically reversed to take out the twist in the wires back to the shed. The main pickets, that is the ones which extend the full height of the fence, are introduced between the warp wires adjacent the shed from one side of the fence, while the hairpin pickets are introduced between the wires at the rear end of the machine and are then pushed forward into the shed by means of a lazy-tongs mechanism, after the twist has been taken out of the wires back to the shed. The hair-pin pickets enter the machine as straight lengths, but on being pushed forward are first bent at right angles so that only the forward leg of the hairpin is caught in the twist of the warp wires. Thereafter a main picket is introduced into the fence and made fast by twisting of the warp, and then the rear leg of the hairpin is bent around parallel to the forward leg of the hairpin and secured by the twisting of the warp. In the meantime, as each main picket is fed into the fencing, the free end of the second previous main picket is bent over into the shed with the new main picket and made fast therewith by the twisting of the warp wires which transverse that portion of the fencing. Thus at the top of the fence the arches cross each other, or in other words, each main picket end is bent over the next succeeding picket, and secured with the second succeeding picket.

Driving gear

The bed of my machine is in the form of a rectangular frame 25. Near the forward end of the machine (the left-hand end as viewed in Figs. 1 and 2) is the main power shaft 26 which is suitably journaled in the frame 25. Keyed to the shaft 26 is a driving pulley 27, and a pinion 28, also keyed to the shaft, meshes with a gear 29 keyed to a shaft 30. The latter extends transversely across the machine and is journaled in the frame 25. Keyed to the shaft 30 is a sprocket wheel 31. At the rear end of the machine there is another transverse shaft 32 suitably journaled in the frame 25. On this shaft is keyed a sprocket wheel 33, and a chain belt 34 connects the sprocket wheels 31 and 33.

Immediately in advance of the shaft 32 there are two transverse shafts 35 and 36 respectively. Mounted to turn freely on the shaft 35 is a sprocket wheel 37 which engages the upper reach of the chain belt 34, the latter being pressed up against the sprocket wheel by means of an idler 38 suitably journaled in the frame 25. The sprocket wheel 37 carries a second sprocket wheel 39 which is connected by chain belt 40 to a large sprocket wheel 41 mounted on the shaft 36. Thus by means of the chain and sprocket wheel gearing just described, the shaft 36 is rotated at a reduced rate of speed by the driving shaft 26.

The shaft 36 imparts an intermittent rotary motion to the shaft 35 through a pair of mutilated gears 42 and 43 keyed to said shafts respectively. Keyed to the shaft 35 at each end thereof and outside the frame 25, is a disk wheel 44 which carries a roller 45 eccentrically mounted thereon. At each side of the machine there is a connecting rod 46 formed at one end with a head 47 having a vertical slot 48 therein and at the opposite end with a head 49 formed with a longitudinal slot 50 therein. The roller 45 is adapted to engage the slot 48 and cause the connecting rod 46 to reciprocate as the wheel 44 rotates. The head 49 is slotted to provide clearance for a shaft 51 (Fig. 6) which extends transversely across the machine passing through the slots 50 of the opposite heads 49. Each head 49 is supported in a slideway 52 and the body of each connecting rod is supported in a slideway 53, the slideways being bolted or otherwise secured to the outer face of the frame 25. The opposite projecting ends of the shaft 51 each carry a pair of toothed pinions 54 and 55 mounted to turn freely thereon, and a ratchet wheel 56 is keyed to the shaft between the pinions. Each ratchet wheel is engaged by pawls 57 respectively secured to the pinions. The pinions 54 and 55 are respectively engaged by upper and lower racks 58 and 59 carried on the heads 49, the lower racks being laterally offset to clear the pinions 54. Thus as the connecting rods 46 are reciprocated by the eccentrically mounted rollers 45, the shaft 47 will be driven intermittently but always in the same direction, the direction being counter clockwise, as viewed in Figs. 2 and 6. The intermittent gears 42 and 43 are so designated as to cause a dwell in the reciprocation of the connecting rods 46 at the end of each stroke thereof and also at the middle of each forward and rear stroke.

Conveyer

The conveyer on which the fencing is formed and which carries the product to a take-up roller at the forward end of the machine, comprises two endless belts 60 and 61 which run side by side, the former serving to support the lower part of the fencing, that is the part containing the hairpin pickets, and the latter serving to support the upper part of the fencing. The belts are supported and driven by front and rear pulleys 63 and 62 mounted respectively on shafts 64 and 65 which extend transversely across the machine and are journaled in the frame 25.

The shafts 64 and 65 are coupled together by means of a chain 66 which connects sprocket wheels 67 and 68 mounted on said shafts respectively, and the shaft 64 is driven by the shaft 51 through intermeshing gears 69 and 70 mounted respectively on the shafts 51 and 65. The conveyer belts 60 and 61 are formed of slats provided with ribs 71 which are adapted to bear against the pickets of the fencing between the warp wires and keep the pickets normal to the warp wires. The slats are hinged together to form endless belts. The belt 60 at its inner edge is provided with anvils 72 (Fig. 11) about which the hairpin pickets are bent, and similarly the belt 61 is provided with anvils 73 (Fig. 4) about which the arches of the main pickets are formed. The detail construction of these anvils and the manner in which they are connected to the conveyer belts, will be explained hereinafter. Immediately in front of the shaft 65 is an idler roller 74 suitably journaled in the side frame 25, over which the fencing passes as it leaves the conveyer belts. Thence the fencing proceeds to a collapsible take-up roller 75 rotated by friction drive from the shaft 30. The friction drive consists of a belt 76 which connects a small driving pulley 77 on the shaft 30 and a large driving pulley 78 on the shaft 79 of the take-up roller.

Twisting mechanism

The warp wires 80 are arranged in pairs, as explained above, and are taken from any suitable source of supply at the rear of the machine and extend lengthwise of the machine across the slats of the conveyer belt to the take-up roller 75. At the rear of the conveyer belts the pairs of wires 80 pass through twister heads. Each twister head is longitudinally split to permit of separating each pair of wires when the pickets are being introduced. As best shown in Figs. 3 and 7 to 10 inclusive, each twister head comprises a fixed lower member 81 and a vertically slidable upper member 82. The lower member is seated on a cross rail 83 running transversely across the machine and may be secured at the desired adjustment along this rail by means of a clamp 84. The upper member 82 of the twister heads are all secured to a cross rail 85 which at opposite ends thereof is provided with sliding bearings 86. The latter have engagement with vertical posts 87 which are connected at their lower ends to the bed 25 and are supported at their upper ends in brackets 88 which rise from the bed or frame 25. The upper and lower members 82 and 81 are each formed with a semi-cylindrical bore which unite to form a cylindrical bore when the two members are moved into engagement one with the other, and in this bore a spindle comprising a pair of semi-cylindrical needles 89 and 90, is adapted to rotate. Each needle is formed with a longitudinal bore through which a warp wire 80 is threaded, that is one of the wires of a pair is threaded through the needle 89 and the other wire through the needle 90. Each needle is formed at opposite ends thereof with semi-annular shoulders 91 which are under-cut to engage semi-annular seats 92 formed on opposite ends of the members 81 and 82. Because of the under-cut shoulders the the needles will adhere to said members when the latter are moved apart. In order to turn the needles in the twister heads and twist the wrap wires, I provide a transverse shaft 93 which passes through the entire series of lower members 81, and in each member 81 there is a spiral gear 94 keyed to the shaft 93 and adapted to engage a spiral gear 95 carried by the needles. However, the spiral gear 95 is split in two with one-half formed on one of the needles and the other on the other needle, and the semi-cylindrical bores of the members 81 and 82 are suitably recessed, as shown in Fig. 8, to clear the gear 95.

The shaft 93 is rotated by means of a pinion 96 at each end thereof which engages a rack 97 on the inner face of each head 49. Thus, as the connecting rod 46 moves back and forth, it serves to turn the needles in the twister heads and twist the warp wires first in one direction and then in the opposite direction. However, it will be remembered that there is a dwell at the middle of each forward and rear stroke of the connecting rod 46 so that the twisting operation is interrupted not only at the end of each alternate series of twistings, but also at the middle of each twisting operation. The warp wires may be given, say, three twists right-handed, after which there will be a dwell before they receive three more twists in the same direction; thereupon there will be another dwell followed by three twists in the left-hand direction and a pause followed by three more twists in the left-hand direction. At each pause in the twisting operation the needles will have been turned to such position as to engage only one of the opposed members 81 and 82 respectively, and during the pause the members will be separated by lifting of the upper members 82. This is accomplished by means of mechanism actuated by the shaft 36. At each side of the machine there is a pair of toggle links 98 and 98' connected at their adjacent ends by a link 99 to a rod 100, while the remote end of toggle link 98 is connected to the frame of the machine, and the remote end of link 98' is connected to the cross rail 85 which carries the upper members 82 of the twister heads. The slide rods 100 are intermittenly reciprocated by cams 101 on the shaft 36. Thus at each rotation of the shaft 36 the slide rods 100 are moved forward, lifting the cross rail 85 and then are drawn back to lower the cross rail. These operations are timed to take place during each dwell of the twisting operation.

Picket feed

As explained above, the main pickets are introduced into the shed of the warp wires from the side of the machine immediately in advance of the twisting heads, while the secondary or hairpin pickets are introduced between the warp wires at the rear end of the machine. Both the main and secondary pickets are formed of wire which is crimped as it is fed into the machine and is then cut off to the desired length. Wire for the main pickets is crimped and fed into the machine by a pair of crimping wheels 102 and 103 (Figs. 2 and 3) journalled in a bracket 104. The crimping wheels are suitably geared together and are driven through a train of gears and a chain belt 106, by a sprocket wheel 107 carried by the shaft 30. The train of gears includes a set of mutilated gears 105 so that the crimping wheels will operate to feed a main picket into the machine at every other alternate opening of the twister heads. As the main picket is fed into the machine it passes between a cutter 108 and an anvil 109. As shown in Fig. 6, the cutter is carried by an arm 110 pivoted at one end to the bracket 88 and connected at the other end by a link 111 to the cross rail 85, so that when the latter descends to close the twister heads, it cuts off a suitable length of crimped wire to form a main picket 112. Each main picket enters the machine between the warp wires and immediately in advance of the twister heads while the latter are open. Beater fingers 113 move forward automatically during the closing of the twister heads and beat the picket into the shed. The beaters 113 are carried by a shaft 114 journaled in brackets 115 carried by the cross rail 85. A pinion 116 is keyed to the shaft 114 and meshes with an idler 117 journaled to the bracket 115. The idler in turn, engages the rack 118 supported on a cross head carried by the brackets 88. Thus as the members 82 are moved upward to spread open the twister heads, the beater fingers 113 are retracted, as shown in Fig. 7, and as the twister heads close the beaters 113 move forward pushing the main picket 112 forward into the shed. The conveyer advances the fencing while the next twisting operation takes place.

Wire for the hair pin pickets 120 is fed into the machine near the rear end thereof, (see Fig. 13), through a pair of crimping wheels 121 and 122 journaled in a bracket 123 and driven through a suitable gear train by the shaft 35. The gear train includes a pair of mutilated beveled gears 124 and 125 (Fig. 12), so that the crimping wheels operate intermittently at every fourth operation of the twister heads to feed the crimped wire into the machine. After a sufficient length of wire for a hairpin picket has been fed in, a cutting mechanism comes into play to cut off a picket length and the operation of the crimping wheels is interrupted. Said cutting mechanism comprises a cutter blade 126 mounted on a wheel 127 and revolved into engagement with a fixed anvil 128. The wheel 127 is driven through a set of change gears 129 by the driving gear train of the crimping wheels, so that by varying the gear ratio of the change gears the length of wire cut off for a hairpin picket may be varied.

As the picket wire issues from the crimping wheels 121 and 122, it enters slotted picket guides 130 carried by a transverse bar 131. The latter is supported between pairs of guide rails 132 which extend lengthwise of the machine and serve to guide the bar 131 as it moves forward to the twister heads. Motion of the guide bar 131 is effected by two sets of lazy-tongs 133 (Fig. 12), each of which is connected at the forward end to the bar 131. The rear links of each lazy-tongs are connected to a carriage 134 at a point 135, and the second links from the rear of the lazy-tongs are pivoted to a bracket 136 at a point 137. The bracket 136 is bolted to a cross rail 138 running transversely across the bed of the machine. The bracket is formed with a rearwardly extending slide bar 139 on which the carriage 134 is adapted to slide. An arm 140 depending from the carriage is formed with a horizontal slot 141, to straddle the shaft 36, and carries a roller 142 adapted to engage a cam groove in a cam 143 keyed to the shaft 36. When the carriage 134 is moved forward by the cam to the position shown in Fig. 12, the lazy-tongs are retracted, but when the carriage 134 is drawn rearward, the lazy-tongs are extended, forcing the hairpin picket 120 forward between the open twister heads into position to be seized by the beater fingers 113 and be carried into the shed at the next closing movement of the twister heads.

Picket bending mechanism

As shown in the plan view, Fig. 1, the conveyer belts 60 and 61 are arranged in staggered relation, or in other words, the slats of belt 60 break joints with the slats of belt 61. The pulleys 62 and 63 on which the belts travel, are angular, and the pulleys supporting belt 60 are angularly advanced with respect to the pulleys supporting belt 61. This is clearly indicated in Fig. 10. Hinged to the inner end of each slat of belt 60, is a pair of anvils 72 (Fig. 17) which rise above the surface of the slat and are separated by a gap through which a main picket 112 may be passed. The anvils are formed with pins 145 adapted to engage a fixed track or guide rail 146. Immediately in advance of the twister heads there is a vertical shaft 147 (Fig. 11) provided at its lower end with a pinion 148 which engages a rack 149. The latter is carried by a rod 150 which is reciprocated by a cam 151 carried by the shaft 36. At the upper end of the shaft 147 there is an arm 152 formed with an upturned finger 153 which projects above the plane of the warp wires immediately to the rear of the line along which the main picket 112 is fed into the machine. As the lazy-tongs mechanism moves a hairpin picket through the twister heads, the picket encounters the finger 153 and is bent to a right-angled position (see broken line position in Fig. 11) so that only the lower half of the picket is caught by the beaters 113 and pushed forward into the shed, the other half of the picket in the meantime extending toward the rear of the loom approximately parallel to the warp wires. In this position the forward half of the hairpin picket is secured by the twisting of the warp wires and the right-angled portion is held by the finger 153 while the next main picket 112 is fed across it and secured in the fencing by the next twisting operation. After the main wire has been secured, the cam 151 operates to turn the shaft 147 so that the finger 153 bends the rear leg of the hairpin picket about the pair of anvils 72 and into the shed.

A similar mechanism is employed to form the arches at the ends of the main pickets 112. Each slat of the belt 61 carries a single anvil 73 which is hinged to the slat at a point 154 and is pressed upward to normal position by a spring 155. Each anvil carries a roller 156 which engages a track or guide rail 157. Adjacent the rear end of the belt 61 there is a vertical shaft 158 (Figs. 3 to 5), which at its lower end carries a pinion 159 meshing with a rack 160. The rack is adapted to slide in a bracket 161 and is secured to the end of a rod 162 which is reciprocated by a cam 163 on the shaft 36. The upper end of the shaft 158 rises above the plane of the fencing and carries an arm 164. Journaled in the arm 164 is a horizontal shaft 165 which carries a depending finger 166. A spring 167 on the shaft 165 serves normally to hold the finger 166 in vertical position, but permits the finger to swing forwardly.

It will be recalled that the end of each main picket is bent over the next succeeding picket and is secured in the shed with the second succeeding picket. In order to explain this operation, I have used, in Figs. 4 and 5, the numerals 112, 112' and 112² to designate the main picket that is being fed into the machine, the next preceding picket and the second preceding picket, respectively. It will be seen that as the belt 61 advances, the ends of the main pickets strike the vertical shaft 158 below the arm 164. In Fig. 4, the picket 112² has been bent rearwardly into the path of the finger 166, while the picket 112' has been only slightly bent and is not in position to be engaged by the finger 166. While the new picket 112 is being fed into the machine immediately in advance of the finger 166, the cam 163 operates to swing the arm 164 and carry the end of picket 112² about a pair of anvils 73 and into the shed. In this position the picket is held by the finger 166 until it is caught by one of the beaters 113 which advance with the picket 112, forcing the latter picket and the arched end of picket 112² into the shed. The cam 163 then withdraws the finger 166 and at the next feed of a main picket into the machine the end of picket 112' will have been bent into position to snap past the finger 166 and be carried by said finger into the shed.

The anvils 72 and 73 rise into the fencing and fit snugly into the arches of the pickets bent around them. In order to form the arches truly, it is necessary to have the anvils supported in truly horizontal position during the bending operation. The track 157 is so formed as to depress each anvil 73 as it is being carried around the pulleys 62 (see Fig. 15), so that it will not interfere with the bending operation taking place on the preceding anvil, but just as the anvil passes around to the upper horizontal reach of the belt, the spring 155 forces the anvil to swing up quickly into position for the bending operation. At the forward end of the conveyer belts it is necessary to withdraw the anvils 72 and 73 from engagement with the fencing, so that the latter will clear the conveyer belt and proceed to the takeup roller 75. This is accomplished by providing a depression in the tracks 146 and 157, which will force the anvils downward to clear the fencing.

*Operation of the machine*

The operation of my machine has already been described in connection with the descriptions of the various mechanisms, but the following resumé may prove of value as showing the relation of the various mechanisms. In this connection Figs. 19 to 23 inclusive, showing successive stages in the weaving of the fencing, will prove useful.

The warp wires 80 are arranged in pairs and run the full length of the machine, being twisted periodically in opposite directions to secure the pickets in the fencing. Assuming that a hairpin picket has been introduced into the machine and secured to the fencing by, say, three twists of the warp wires back of the rear leg of the hairpin, a main picket 112 is fed into the machine between the open twister heads and immediately in advance of the beaters 113, the picket being crimped as it is fed in by the crimping wheels 102 and 103 and cut off to suitable length by the cutter 108. Fig. 19 shows the fencing at this stage with the end of the second previous picket 112² about to be bent into the shed. The next view Fig. 20, shows the picket end 112² after being bent into the shed. At this stage the toggle links 98 and 98' are withdrawn by the operation of the cam 101, causing the twister heads to close. The twister heads are then twisted in the opposite direction by mechanism controlled by the roller 45 eccentrically carried by the wheel 44. After the wheel 44 has made a quarter turn, it stops, and the toggle links are operated to open the twister heads again. While the twister heads were putting a twist in the warp wires in advance of the twister heads to secure the main picket, they were taking the twist out of the warp wires to the rear of the twister heads, thus leaving a passage clear for the movement of a hairpin picket between the warp wires, through the open twister heads and into the shed. Fig. 21 shows the hairpin picket 120 in the shed. The lazy-tongs which move the hairpin picket forward, engage only the lower half of the hairpin picket, and as the latter is fed forward it is bent at right angles by engagement with the finger 147. In the meantime, the beaters 113 engage the lower half of the hairpin picket, and the lazy-tongs retreat while the toggle links are operated to close the twister heads. Thereupon the twisting operation is resumed in the same direction to complete the twisting of the warp wires between the main pickets and to secure the forward leg of the hairpin picket. During this twisting operation the warp wires are twisted both in front of and to the rear of the twister heads. At the next operation the toggle links are pressed forward to open the twister heads, and at the same time another main picket is fed into the loom immediately in advance of the twister heads and across the right-angled rear leg of the hairpin picket. The twister heads then close, and the beaters 113 force the main picket into the shed while the finger 166 is operated to arch the end of the main picket 112¹, about the anvil 73 and into the path of the beaters 113. Fig. 22 shows the fencing at this stage of the operations. The twister heads are then turned in the opposite direction because the roller 45 has now passed the horizontal diameter of the disk 44, and the twisting continues while the roller passes through an angle of 90 degrees. Thereupon the toggle links are again operated to open the twister heads. The twist having been taken out of the warp wires by the last twisting operation, the way is now clear for the rear leg of the hairpin pickets to pass between the warp wires. Thus on the opening of the twister heads the finger 153 is operated to bend the rear leg of the hairpin picket into position parallel with the forward leg thereof, so that it may be seized by the beaters 113 and forced into the shed upon the next closing of the twister heads. The twister heads are then operated to twist the warp wires in the same direction, while the roller 45 is passing through another angle of 90 degrees. This completes a cycle of operations which is repeated as long as the machine is operated.

Having thus described my invention, and with the understanding that various changes in the construction and arrangement of the parts may be made without departing from the spirit and scope of my invention I claim:

1. In the method of forming a wire fence, the steps which comprise, twisting pairs of warp wires intermediate their ends, periodically interrupting the twisting, spreading apart the wires of the several pairs at each interruption to form a shed, reversing the direction of twisting after each odd numbered interruption to take out the twist in the wires back of the shed, introducing a long picket into the shed during each odd numbered interruption, and introducing a short picket into the shed during each even numbered interruption.

2. In the method of forming a wire fence, the steps which comprise, twisting pairs of warp wires intermediate their ends, periodically interrupting the twisting, spreading apart the wires of the several pairs at each interruption to form a shed, reversing the direction of twisting after each odd numbered interruption, introducing a long picket into the shed during each odd numbered interruption, introducing a short picket into the shed during each even numbered interruption, and bending an end of each long picket between the warp wires adjacent a succeeding long picket.

3. In the method of forming a wire fence, the steps which comprise, twisting pairs of warp wires intermediate their ends, periodically interrupting the twisting, reversing the direction of twisting after each odd numbered interruption, introducing a long picket between the twisted warp wires during each odd numbered interruption, introducing a short picket between the warp wires during each even numbered interruption, and bending an end of each long picket between the warp wires adjacent the second succeeding long picket.

4. In the method of forming a wire fence, the steps which comprise, periodically twisting pairs of warp wires intermediate their ends, spreading apart the wires of the several pairs at the end of each twisting operation to form a shed, reversing the twisting after each odd numbered twisting period to take out the twist in the wires back of the shed, introducing a picket into the shed after each odd numbered twisting period in a direction transverse to that of the warp wires, introducing a picket into the shed after the first of each pair of even numbered twisting periods in a direction parallel to that of the warp wires, bending one-half of the latter picket to clear the warp wires during the next two twisting periods, and bending the other half of said latter picket into the shed after the second of the pair of even numbered twisting periods.

5. In the method of forming a wire fence, the steps which comprise, twisting pairs of warp wires intermediate their ends, periodically interrupting the twisting, reversing the twisting after each odd numbered interruption, introducing a long picket between the twisted warp wires during each odd numbered interruption, introducing one leg of a hair-pin picket between the warp wires during the first one of each pair of even numbered interruptions, holding the other leg clear of the warp wires during the next two twisting operations, and bending the other leg of the hairpin picket in between the warp wires during the second one of the pair of even numbered interruptions.

6. In the method of forming a wire fence, the steps which comprise, twisting pairs of warp wires intermediate their ends, periodically interrupting the twisting, spreading apart the wires of the several pairs at each interruption to form a shed, reversing the direction of twisting after each odd numbered interruption to take out the twist in the wires back of the shed, introducing a long picket into the shed between the twisted warp wires at each odd numbered interruption, introducing one leg of a hairpin picket into the shed during the first one of each pair of even numbered interruptions, holding the other leg of the hair-pin picket clear of the warp wires during the next two twisting periods, and bending said other leg of the hair-pin picket into the shed during the second one of the pair of even numbered interruptions.

7. In the method of forming a wire fence, the steps which comprise, twisting pairs of warp wires intermediate their ends, periodically interrupting the twisting, spreading apart the wires of the several pairs at each interruption to form a shed, reversing the direction of twisting after each odd numbered interruption to take out the twist in the wires back of the shed, introducing a long picket into the shed between the twisted warp wires during each odd numbered interruption, introducing one leg of a hair-pin picket into the shed during the first one of each pair of even numbered interruptions, holding the other leg of the hair-pin picket clear of the warp wires during the next two twisting periods, bending said other leg of the hair-pin picket into the shed during the second one of the pair of even numbered interruptions, and bending an end of each long picket into the shed adjacent a succeeding long picket.

8. In the method of forming a wire fence, the steps which comprise, twisting pairs of warp wires intermediate their ends, periodically interrupting the twisting, spreading apart the wires of the several pairs at each interruption to form a shed, reversing the direction of twisting after each odd numbered interruption to take out the twist in the wires back of the shed, introducing a long picket into the shed between the twisted warp wires during each odd numbered interruption, introducing one leg of a hair-pin picket into the shed during the first one of each pair of even numbered interruptions, holding the other leg of the hair-pin picket clear of the warp wires during the next two twisting periods, bending said other leg of the hair-pin picket into the shed during the second one of each pair of even numbered interruptions, and bending an end of each long picket into the shed adjacent the second succeeding long picket.

9. In a machine of the character described, a plurality of separable twister heads each adapted to carry a pair of warp wires, twisting means for intermittently operating the twister heads to twist each pair of wires, means operating in alternation with the operation of the twisting means for opening the twister heads to form a shed and closing the twister heads thereafter, means for introducing a picket into the shed during opening of the twister heads, and beater fingers operated by the twister heads and adapted on closure of the twister heads to beat the picket into the shed.

10. In a machine of the character described, a plurality of separable twister heads each adapted to carry a pair of warp wires, twisting means for intermittently operating the twister heads to twist each pair of wires, means operating in alternation with the operation of said twisting means for separating the twister heads to form a shed in the warp wires and thereafter closing the twister heads, a picket carrier, means for operating the carrier to introduce a picket through the twister head during separation thereof, and beater fingers operating on closure of the twister heads to beat the picket into the shed.

11. In a machine of the character described, a plurality of separable twister heads each adapted to carry a pair of warp wires, twisting means for periodically operating the twister heads to twist each pair of wires, means operating in alternation with the twisting means for spreading the twister heads open to form a shed in the warp wires and closing the twister heads thereafter, means for periodically reversing the operation of the twisting means to untwist the warp wires back of the twister heads, means for introducing a picket between the warp wires back of the twister heads, and means for advancing the picket through the twister heads into the shed during separation of the twister heads and while the warp wires back of the twister head are untwisted.

12. In a machine of the character described, a plurality of separable twister heads each adapted to carry a pair of warp wires, twisting means for periodically operating the twister heads to twist each pair of wires, means operating in alternation with the operation of said twisting means for separating the twister heads to form a shed in the warp wires, means for periodically reversing the operation of the twisting means to untwist the warp wires back of the twister heads, a picket carrier back of the twister heads, and lazy tongs mechanism for advancing the carrier to introduce a picket into the shed through the twister heads during separation thereof and while the warp wires back of the twister heads are untwisted.

13. In a machine of the character described, a plurality of separable twister heads each adapted to carry a pair of warp wires, twisting means for periodically operating the twister heads to twist each pair of wires, means operating in alternation with the operation of said twisting means for separating the twister heads to form a shed in the warp wires and thereafter closing the twister heads, means for periodically reversing the operation of the twisting means to untwist the warp wires back of the twister heads, a picket carrier back of the twister heads, means for operating the carrier to advance a picket through the twister heads during separation thereof and while the warp wires back of the twister heads are untwisted, and means for beating the picket into the shed.

14. In a machine of the character described, a plurality of separable twister heads each adapted to carry a pair of warp wires, twisting means for periodically operating the twister heads to twist each pair of wires, means operating in alternation with the operation of said twisting means for separating the twister heads to form a shed in the warp wires and thereafter closing the twister heads, means for periodically reversing the operation of the twisting means to untwist the warp wires back of the twister heads, a picket carrier back of the twister heads, means for operating the carrier to advance a picket through the twister heads during separation thereof and while the warp wires back of the twister heads are untwisted, and beater fingers carried by the twister heads and actuated by closure of the twister heads to beat the picket into the shed.

15. In a machine of the character described, a plurality of separable twister heads each adapted to carry a pair of warp wires, twisting means for intermittently operating the twister heads to twist each pair of wires, means operating in alternation with the operation of said twisting means for separating the twister heads to form a shed in the warp wires and thereafter closing the twister heads, means for crimping picket wire, means for cutting off a length of the crimped wire to form a picket, and means for introducing the picket into the shed during separation of the twister heads.

16. In a machine of the character described, a plurality of separable twister heads each adapted to carry a pair of warp wires, twisting means for intermittently operating the twister heads to twist each pair of wires, means operating in alternation with the operation of said twisting means for separating the twister heads to form a shed in the warp wires and thereafter closing the twister heads, means for crimping picket wire, means for cutting off a length of the crimped wire to form a picket, means for introducing the picket into the shed during separation of the twister heads, and beater fingers carried by the twister heads and actuated by closure of the twister heads to beat the picket into the shed.

17. In a machine of the character described, a plurality of separable twister heads each adapted to carry a pair of warp wires, twisting means for periodically operating the twister heads to twist each pair of wires, means operating in alternation with the twisting means for separating the twister heads to form a shed in the warp wires, means for introducing a long picket between the twisted warp wires during each odd numbered separation of the twister heads, means for reversing the twisting of the twister heads after each long picket has been introduced to take the twist out of the warp wires back of the twister heads, means for introducing a short picket between the warp wires during each even numbered separation of the twister heads.

18. In a machine of the character described, a plurality of separable twister heads each adapted to carry a pair of warp wires, twisting means for periodically operating the twister heads to twist each pair of wires, means for periodically separating the twister heads to form a shed in the warp wires, means for reversing the direction of twisting after each odd numbered twisting period to take out the twist in the warp wires back of the shed, means for introducing a main picket into the shed during each odd numbered separation of the twister heads, means for introducing a secondary picket into the shed through the twister heads during the first of each pair of even numbered separations of the twister heads, means for bending one-half of said secondary picket to clear the warp wires during the next two twisting periods, and means for bending said half of the secondary picket into the shed during the second of the pair of even numbered twisting periods.

19. In a machine of the character described, a plurality of separable twister heads each adapted to carry a pair of warp wires, twisting means for periodically operating the twister heads to twist each pair of wires, means operating in alternation with the twisting means for opening the twister heads to form a shed in the warp wires after each twisting operation, means for introducing a main picket into the shed during each odd numbered separation of the twister heads, means for reversing the twisting of the twister heads after each odd numbered separation thereof in order to take out the twist in the warp wires back of the twister heads, means for introducing a secondary picket through the twister heads and into the shed during the first of each pair of even numbered separations of the twister heads, means for bending one-half of the latter picket clear of the warp wires, and means for bending said half of the picket through the twister heads and into the shed during the second of the pair of even numbered separations of the twister heads.

20. In a machine of the character described, a plurality of separable twister heads each adapted to carry a pair of warp wires, twisting means for periodically operating the twister heads to twist each pair of wires, means operating in alternation with the twisting means for opening the twister heads to form a shed in the warp wires after each twisting operation, means for introducing a main picket into the shed during each odd numbered separation of the twister heads, means for reversing the twisting of the twister heads after each odd numbered separation thereof in order to take out the twist in the warp wires back of the twister heads, means for introducing a secondary picket through the twister heads and into the shed during the first of each pair of even numbered separations of the twister heads, means for bending one-half of the latter picket clear of the warp wires, means for bending said half of the picket through the twister heads and into the shed during the second of the pair of even numbered separations of the twister heads, and means for bending an end of each main picket into the shed adjacent a succeeding main picket.

21. In a machine of the character described, a plurality of separable twister heads each adapted to carry a pair of warp wires, means for periodically operating the twister heads to twist each pair of wires, means operating in alternation with the twisting means for opening the twister heads to form a shed in the warp wires after each twisting operation, means for introducing a main picket into the shed during each odd numbered separation of the twister heads, means for reversing the twisting of the twister heads after each odd numbered separation thereof in order to take out the twist in the warp wires back of the twister heads, means for introducing a secondary picket through the twister heads and into the shed during the first of each pair of even numbered separations of the twister heads, means for bending one-half of the latter picket clear of the warp wires, means for bending said half of the picket through the twister heads and into the shed during the second of the pair of even numbered separations of the twister heads, and means for bending an end of each picket into the shed adjacent the second succeeding main picket.

22. In a machine of the character described, a plurality of separable twister heads each adapted to carry a pair of warp wires, twisting means for periodically operating the twister heads to twist each pair of wires, means operating in alternation of the twisting means for opening the twister heads to form a shed in the warp wires after each twisting operation, means for introducing a main picket into the shed during each odd numbered separation of the twister heads, means for reversing the twisting of the twister heads after each odd numbered separation thereof, means for introducing secondary pickets into the shed during even numbered separations of the twister heads, means for bending a part of each secondary picket clear of the warp wires, and means for bending said part into the shed during a succeeding even numbered separation of the twister heads.

23. In a machine of the character described, a plurality of separable twister heads each adapted to carry a pair of warp wires, twisting means for periodically operating the twister heads to twist each pair of wires, means operating in alternation of the twisting means for opening the twister heads to form a shed in the warp wires after each twisting operation, means for introducing a main picket into the shed during each odd numbered separation of the twister heads, means for reversing the twisting of the twister heads after each odd numbered separation thereof, means for introducing secondary pickets into the shed during even numbered separations of the twister heads, means for bending a part of each secondary picket clear of the warp wires, means for bending said part into the shed during a succeeding even numbered separation of the twister heads, and means for bending an end of each main picket into the shed adjacent a succeeding main picket.

24. In a machine of the character described, a plurality of separable twister heads each adapted to engage a pair of warp wires, a shaft for rotating the twister heads to twist the warp wires, a gear on the shaft, a rack engaging the gear, a cam for reciprocating the rack, means for interrupting movement of the rack at the end of and intermediate each stroke thereof, means for separating the twister heads during each interruption of the rack to form a shed, means for introducing a picket between the warp wires during each separation of the twister heads, and means for beating the picket into the shed.

25. In a machine of the character described, a plurality of separable twister heads each adapted to engage a pair of warp wires, a shaft for rotating the twister heads to twist the warp wires, a gear on the shaft, a rack engaging the gear, a cam for reciprocating the rack, means for interrupting movement of the rack at the end and half way of each stroke thereof, means for separating the twister heads during each interruption of the rack to form a shed, means for introducing a short picket between the warp wires at each half-stroke interruption of the rack, means for introducing a long picket between the warp wires at each end-stroke interruption of the rack, and means for beating the pickets into the shed.

26. In a machine of the character described, a twister head having a fixed housing member and a movable housing member, means for alternately separating and rejoining said members, a beater finger, and means for withdrawing the beater finger on separation of said members and advancing said finger as said members are rejoined.

27. In a machine of the character described, a twister head having a fixed lower housing member and a movable upper housing member, means for alternately raising and lowering the movable member, a beater finger journaled on the movable member, a fixed rack, and gearing connecting the beater finger and the rack whereby the finger will be swung rearward as it is raised and forward as it is lowered.

28. In a machine of the character described, a twister head comprising a housing, a spindle rotatable therein, a gear carried by the spindle, the spindle and gear being axially divided into halves, each half of the spindle having a longitudinal bore through which a warp wire is threaded, the housing comprising a fixed lower member and a movable upper member, each member being formed to engage a half of the spindle and gear, a driving gear carried by the fixed member and adapted to engage and drive the gear on the spindle, and means for raising the upper member to spread the spindle halves apart.

29. In a loom for forming wire fencing of longitudinal warp wires and transverse pickets, a conveyer adapted to support the fencing, anvils hinged to the conveyer, means for bending the pickets about the anvils, and a track engaged by the anvils, said track supporting the anvils in raised position during bending of the pickets and withdrawing the anvils from engagement with the pickets thereafter.

30. In a loom for forming wire fencing of longitudinal warp wires and transverse pickets, a conveyer adapted to support the fencing, transverse flanges on the conveyer adapted to engage the pickets, anvils carried by the conveyer, means for successively bending the pickets about the anvils, and means for successively withdrawing the anvils from engagement with the pickets after the latter have been bent.

31. In a loom for forming wire fencing of longitudinal warp wires and transverse pickets, a conveyer adapted to support the fencing, anvils carried by the conveyer, means for successively bending the pickets about the anvils, means for holding each anvil clear of a picket being bent about the next preceding anvil and means for withdrawing the anvil from engagement with the picket bent thereabout.

32. In a loom for forming wire fencing of longitudinal warp wires and transverse pickets, a conveyer adapted to support the fencing, anvils carried by the conveyer, bending means for successively bending the pickets about the anvils, a track, rollers carried by the anvils and engaging the track, the track being formed to successively depress each anvil to clear a picket being bent about the next preceding anvil, and a spring serving to raise each anvil successively into position to cooperate with said bending means, the track being also formed to withdraw each anvil from the picket bent thereabout.

33. In a loom for forming wire fencing of longitudinal warp wires and transverse pickets, a conveyer on which the fencing is supported as it is formed, anvils carried by the conveyer, twisting means for intermittently twisting pairs of warp wires, means operating in alternation with the twisting means for spreading the wires of each pair to form a shed, means for introducing pickets between the wires during spreading thereof, the pickets having ends projecting beyond the fencing, a stop against which the ends are bent as the conveyer advances and a latch adapted to engage a bent picket end and bend the end about an anvil into the shed adjacent a succeeding picket.

34. In a loom for forming wire fencing of twisted warp wires and transverse pickets, a conveyer on which the fencing is supported as it is formed, anvils carried by the conveyer, twisting means for intermittently twisting pairs of warp wires, means operating in alternation with the twisting means for spreading the wires of each pair to form a shed, means for introducing pickets between the wires during separation thereof, said pickets having ends projecting beyond the fencing, a spring pressed latch, a stop against which each picket end is bent past the next succeeding picket end and snapped past the latch as the conveyer advances, means for moving the latch to bend the picket end engaged thereby about an anvil and into the shed adjacent the second succeeding picket, and means for beating the latter picket and picket end into the shed.

35. In the method of forming a wire fence, the steps which comprise, twisting pairs of warp wire intermediate their ends, periodically interrupting the twisting, spreading apart the wires of the several pairs at each interruption, to form a shed, reversing the direction of twisting at each odd numbered interruption to take out the twist in the wires back of the shed, introducing a long picket into the shed during each odd numbered interruption, introducing a short picket between the warp wires back of the shed, and moving the short picket forward into the shed during each even numbered interruption.

In testimony whereof, I have signed this specification.

JAMES W. SNEDEKER.